Figure 1:
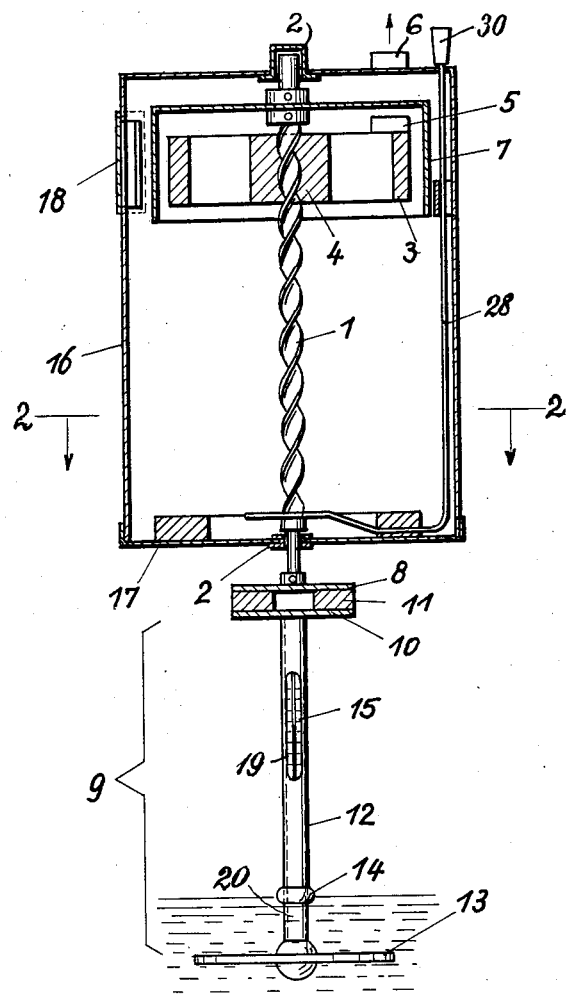

March 31, 1964 F. VÖGTLE ETAL 3,126,735
DEVICE FOR MEASURING THE VISCOSITY OF LIQUIDS
Filed May 2, 1962 2 Sheets-Sheet 1

INVENTORS
Friedrich Vögtle, Gottfried
Vögtle & Fritz Vögtle

BY Lowry & Rinehart

ATTORNEYS

March 31, 1964 F. VÖGTLE ETAL 3,126,735
DEVICE FOR MEASURING THE VISCOSITY OF LIQUIDS
Filed May 2, 1962 2 Sheets-Sheet 2

INVENTORS
Friedrich Vögtle, Gottfried
Vögtle + Fritz Vögtle
BY Lowry & Rinehart
ATTORNEYS

United States Patent Office 3,126,735
Patented Mar. 31, 1964

3,126,735
DEVICE FOR MEASURING THE VISCOSITY OF LIQUIDS
Friedrich Vögtle, Gottfried Vögtle, and Fritz Vögtle, all of 88 Winkelhoferstrasse, Ehingen (Danube), Germany
Filed May 2, 1962, Ser. No. 191,842
Claims priority, application Germany May 2, 1961
8 Claims. (Cl. 73—59)

For the measurement of liquid viscosity numerous devices have already been developed. These range from technically elaborate, sensitive and expensive constructions of various principles to the simple effluence cups of standard contents and standard discharge holes. Whereas the more elaborate and expensive construction find use in laboratories for exact measurements, effluence cups are put to use a great deal in industry, especially in the lac industry, despite the great margin of error. Moreover, apart from the inadequacy of the effluence cups the anomalies in viscosity, when testing liquids, also contribute to difficulties in rheogram research work. The required time for the liquid to run out of the effluence cup is measured, so as to determine the properties of the material, i.e. to ascertain the necessary viscosity by means of the resulting index value. As practically always numerous tests are necessary till the desired viscosity is reached by adding substances, this known measuring method takes up much valuable time and is, in the bargain, laborious.

Viscosimeters have also been designed on the principle of rotation, in which the amount of turning of a rotating body beyond a zero line is measured. The snag in this particular design lies, however, in the fact that it is difficult to impart always the same amount of driving power to the body. Springs, flywheel masses and torsion wire have all been applied as simple means of driving power. However, all these means have to be pretensioned and then released. As already slight variations of driving power lead to inaccurate results, even for industrial purposes, the means mentioned above are hardly suitable. They can only be applied with any justification for stationary arrangements, where the sources of error can be accounted for by further expenditure. In practice these arrangements do not correspond to the requirements needed, for uncomplicated instruments which are small enough in design to be used everywhere are much preferred.

The invention relates to a method of and a method for measuring the viscosity of liquids on the rotation principle. According to the invention the repulsion power of a falling body, which is designed to run along a predetermined path of limited length, is harnessed as driving power to exert a suitable moment of inertia on a suspended, rotary body. A measuring part which rotates and is rigidly yet detachably connected with the rotary body brakes in a known manner when immersed in the test liquid; the amount of braking is then measured. By using a falling body arranged to run between two end positions the driving power is kept constant.

To be able to guarantee the uniformity of the driving power based on gravity it is on all accounts necessary that the releasing of the downward movement is always done in exactly the same way. This can be accomplished by locking and releasing through snap action, for releasing by hand is not very satisfactory. Manual releasing can under certain circumstances cause such differences as to be of great disadvantage in gaining results required. Another characteristic of said invention is that it is equipped with a magnet as locking device which, in turn, allows a comparatively uniform release of the falling body. Furthermore, this arrangement of locking permits the original or starting position of the falling body to be always the same.

Figure 2:
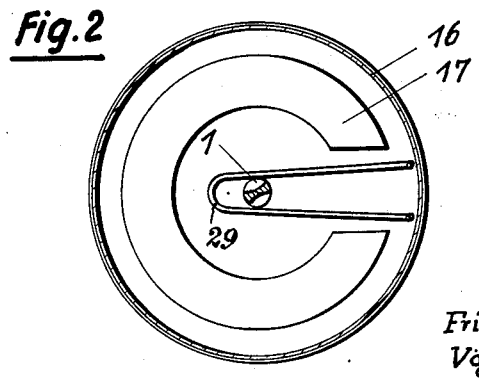
Figure 3:
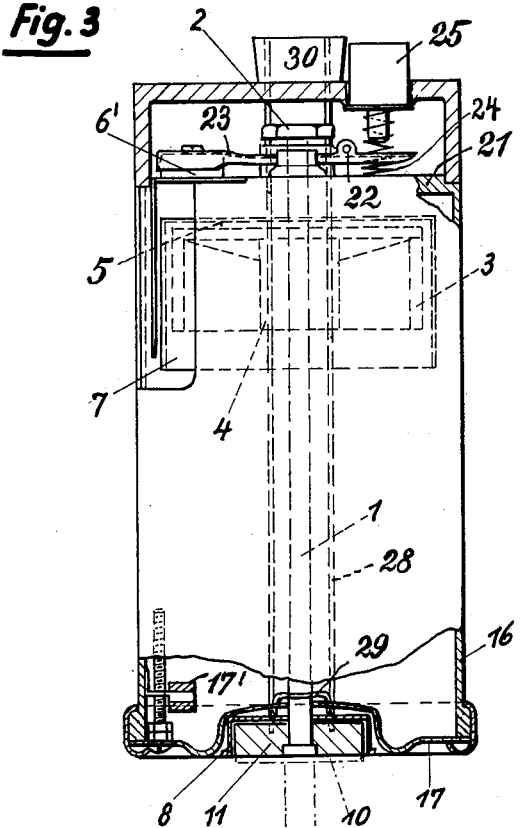
Figure 5:
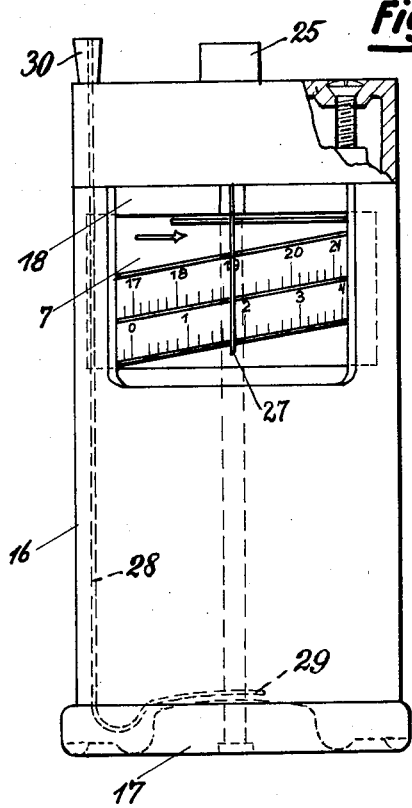
Figure 4:
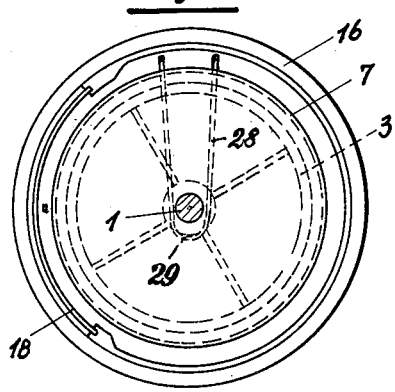
Figure 6:
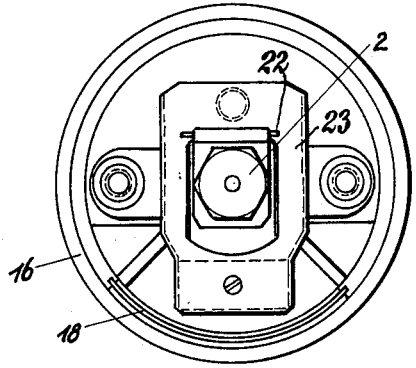

Preferred embodiments of the invention will now be described by way of example and with reference to the accompanying drawings, in which:

FIG. 1 is a side elevational view, partly in section, of measuring device according to the invention;
FIG. 2 is a cross section taken on the line 2—2 of FIG. 1;
FIG. 3 is a view similar to FIG. 1 of a modified top part of the device;
FIG. 4 is a cross section through FIG. 3 detailing the observation window;
FIG. 5 is a view similar to FIG. 3 but turned through 90 degrees, and
FIG. 6 is a cross section, just under the lid of the device, through FIG. 5.

FIG. 1 shows a threaded spindle 1 which is rotatably mounted in bearings 2 of a housing 16. A falling body 3 can move freely along the said threaded spindle 1 by means of a threaded hub 4. The falling body 3 is preferably made of non-magnetic material. An iron plate 5 is fitted to the upper surface of the falling body 3 and co-operates with a magnet 6 to hold the falling body 3 in its original or starting position at the top of the threaded spindle 1. A graduated drum 7 is rigidly mounted on the threaded spindle 1. Instead of the graduated drum 7 a pointer or similar instrument could be used. The lower end of the threaded spindle 1 is connected with a measuring part 9 through coupling parts 8 and 10 and a coupling magnet 11 arranged therebetween. This arrangement is especially advantageous, for it allows quick removal and replacing of the measuring part 9 for cleaning and the like. The said measuring part 9 consists of the coupling part 10, a hollow shaft 12 and a braking body 13, which latter may be shaped like a cylinder, a ball, or the like. The hollow shaft 12 of the measuring part 9 accommodates a thermometer 19 with a temperature feeler 20. The temperature of the liquid can be observed through a viewing aperture 15 provided in the hollow shaft 12. As the temperature of the liquid is very important when taking viscosity tests, the placing of the thermometer 19 inside the hollow shaft 12 and thus in close vicinity to the liquid is extremely advantageous. The housing 16 contains the threaded spindle 1, the falling body 3 and the graduated drum 7. A preferably elastic buffer for the falling body 3 is mounted on the bottom of said housing 16. This buffer may be formed like a ring 17 or, even more appropriate, affixed to one side of the housing wall in the shape of an abutment $17^1$ (FIG. 3).

For taking a measurement the lower end of the measuring part 9 is inserted into the liquid up to an insertion mark 14 provided on the hollow shaft 12. The magnet 6 is then raised by a special device to bring about the release of the falling body 3. According to FIGS. 3 and 6 a double-armed lever 23 is pivoted to a stationary axle 22. A magnet $6^1$ is situated on the lower side at the one end of the double-armed lever 23, whereas the other end is held in an upward position by a compression spring 24. By means of a button 25, which projects through the housing lid, the latter end of the double-armed lever 23 can be depressed which, in turn, lifts the magnet $6^1$. Due both to gravity and to the thread on the spindle 1, the released falling body 3 begins to run downwards in a revolving fashion. The motion of the falling body 3 generates repulsion power (action=reaction) and sets the threaded spindle 1 together with the graduated drum 7 and the measuring part 9 which are secured to the threaded spindle 1 in inversed rotation to the falling body 3.

In dependency upon the amount of resistance the measuring part 9 comes up against in the liquid, the number of revolutions of the falling body 3 or of the threaded spindle 1 (with measuring part 9 and graduated drum 7) is greater. The resistance of low viscous liquids to the revolving braking body 13 is relatively small, so that the repulsion power of the falling body 3 generates a great rotational speed of the threaded spindle 1 and the other parts connected therewith, whereas the falling body 3 itself revolves comparatively slowly. High viscous liquids cause great rotary speed of the falling body 3, whereas that of the threaded spindle 1 is slow. The corresponding, differing rotary motions of the graduated drum 7 can be observed through a window 18 provided in the housing 16 below a partition wall 21 (FIG. 3). When the falling body 3 has completed its journey and arrives at the lower end of the threaded spindle 1 it is stopped by the ring 17 or the abutment 17¹, respectively, and the threaded spindle 1 with its graduated drum 7 is stopped, too. The index value can then be read off. Should the measurement rotation of the drum 7 account for the same in one movement, a circular reading-off scale may be used.

The device can also be so designed that the drum 7 accomplishes two or more measurement rotations. In this case the scale is as shown in FIG. 5 arranged in a helical line with two or more turns. When reading off it is to be kept in mind if and how often the beginning of the scale has passed a zero mark 27 in the window 18. This observation can be made easier by providing the scale with a mark in the form of a dot or the like.

For returning the falling body 3 to its original position the device is turned upside down. When the falling body 3 has arrived back at the top end of the threaded spindle 1 it is once again locked in the zero position by the magnet 6. Another possibility of returning the falling body 3 to its original position can be accomplished by pumping air through the bottom of the housing 16. It is also feasible mechanically to return the falling body 3 to its original position. To this end a re-setting wire 28 is used that consists of two parallel wires running down the inner wall of the housing 16 to form a loop 29 at the bottom to grip around the threaded spindle 1. The top ends of the re-setting wire 28 project through the housing lid and are formed to a grasp 30 or attached to a handle. As soon as the falling body 3 is to be raised the wire 28 is manipulated by the grasp 30 until the falling body 3 is retained by the magnet 6¹. This is only then accomplished when the iron plate 5 is exactly opposite the magnet 6¹. This is to ensure the same starting position every time.

Compared with the known measuring devices the device proposed by the invention permits immediate viscosity readings of liquids and is especially small in size. This device compared with the known rotational viscosimeters is far easier, quicker and even more accurate in use than normal effluence cups allow.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A device for measuring the viscosity of liquids, wherein a rotatably arranged threaded spindle co-axially connected with one end of a measuring part, adapted to be dipped with the other end into a liquid the viscosity of which is to be measured, and provided with a graduated drum for reading the viscosity index numbers, and a falling body with a threaded hub is arranged to run on the threaded spindle between an upper and a lower end position.

2. A device as claimed in claim 1, wherein the threaded spindle is mounted in a housing, a window is provided in the wall of said housing to enable reading off from the graduated drum, a releasing device for the falling body which keeps the latter in its upper end position until fall is provided in the upper region of the housing, and an abutment is mounted in the lower region of the housing to brake and cushion the downward movement of the falling body.

3. A device as claimed in claim 2, wherein the falling body consists of a non-magnetic material, the releasing device for the falling body is in the form of a magnet arranged in the upper region of the housing, and a small iron plate is attached to the non-magnetic falling body for attraction by the magnet which is liftable out of its working position.

4. A device as claimed in claim 2, wherein a mechanism arranged to be manipulated externally is fitted to return the falling body from its lower end position to its original upper end position in the housing.

5. A device as claimed in claim 1, wherein the measuring part comprises a shaft, a braking body secured to the end of said shaft to be dipped into the liquid, an insertion mark provided on the shaft in vicinity to said end, and a thermometer accommodated in the shaft and having a temperature feeler projecting into said end, said braking body being adapted to be braked in its rotation by the liquid during measuring operation, in dependency upon the viscosity of the liquid.

6. A device as claimed in claim 5, wherein the shaft of the measuring part and the threaded spindle are detachably coupled to one another.

7. A device as claimed in claim 6, wherein a magnetic coupling is arranged between the shaft of measuring part and the threaded spindle.

8. A device as claimed in claim 5, wherein the braking body is formed like a disk.

References Cited in the file of this patent

UNITED STATES PATENTS 2,354,299    Bays ------------------ July 25, 1944